United States Patent [19]

Spielmann et al.

[11] Patent Number: 4,531,452
[45] Date of Patent: Jul. 30, 1985

[54] LOCK FOR TRANSMITTER CYLINDER OF HYDRAULIC SYSTEM

[75] Inventors: Norbert Spielmann, Ebern; Hermann Bauer, Lülsfeld, both of Fed. Rep. of Germany

[73] Assignee: FAG Kugelfischer Georg Schafer, Kommanditgesellschaft auf Aktien, Fed. Rep. of Germany

[21] Appl. No.: 554,553

[22] Filed: Nov. 23, 1983

[30] Foreign Application Priority Data

Dec. 15, 1982 [DE]  Fed. Rep. of Germany ....... 3246349

[51] Int. Cl.³ .................... F16J 15/18; F16J 10/02
[52] U.S. Cl. .................................. 92/168; 92/170; 403/20; 403/326
[58] Field of Search ............... 92/168 R, 168 B, 170, 92/164, 169.1; 403/20, 19, 10, 308, 326; 60/533

[56] References Cited

U.S. PATENT DOCUMENTS

| | | | |
|---|---|---|---|
| 2,533,531 | 12/1950 | Stephens | 92/164 |
| 2,799,523 | 7/1957 | Parker | 92/168 |
| 3,490,232 | 1/1970 | Baldwin | 92/168 |
| 3,730,057 | 5/1973 | Friden | 92/168 |
| 4,242,947 | 1/1981 | Renner et al. | 92/164 |

FOREIGN PATENT DOCUMENTS

| | | | |
|---|---|---|---|
| 2442731 | 3/1976 | Fed. Rep. of Germany | 92/168 |
| 2656312 | 6/1978 | Fed. Rep. of Germany | 92/168 |

Primary Examiner—Paul E. Maslousky
Attorney, Agent, or Firm—Ostrolenk, Faber, Gerb & Soffen

[57] ABSTRACT

A transmitter cylinder is used in a hydraulic system and particularly the brake system of an automotive vehicle. To prevent undesired access into the transmitter cylinder, a lock part is installed at the pedal facing end of the cylinder. The lock part is an annulus. The pedal connected piston extends through the lock part and into the transmitter cylinder. The annular lock part is shaped so that its inner bore will guide and center the piston projecting into the cylinder. A locking element for holding the lock part in the cylinder bore is defined. It is either a radial projection from the lock part or it is a retaining ring held in a groove on the exterior of the lock part. In either case, the locking element projects into a groove defined in the interior of the cylinder bore, which retains the lock part in the cylinder bore against undesired extraction. The lock part may be a hollow annulus or a solid body. The lock part is appropriately configured to permit its extraction with appropriate tools.

10 Claims, 4 Drawing Figures

LOCK FOR TRANSMITTER CYLINDER OF HYDRAULIC SYSTEM

BACKGROUND OF THE INVENTION

The invention relates to a transmitter cylinder used in a hydraulic system, that is the hydraulic brake system of an automotive vehicle, or the like.

There are a great variety of transmitter cylinders for hydraulic systems. Their function is to hydraulically convert the force coming from an actuating member, to control it, to amplify it in certain cases and to conduct it via hydraulic conduits to actuating members, such as receiver cylinders. In automobiles, hydraulic brake systems are used alongside of transmitter cylinders, particularly for hydraulic clutch systems. Such transmitter cylinders are known as master brake cylinders and are used in many embodiments. In addition to simple master brake cylinders, there are tandem master cylinders for hydraulic dual-circuit brake systems. The inner structure of the master cylinders is comprised of a plurality of pistons, pressure chambers, packings and return springs and are in part relatively complicated. Up to now, such transmitter cylinders have been closed after their assembly by a stop disk and a retaining ring inserted into a groove in the cylinder bore and fixed thereby axially in space (see German patent application No. OS 30 29 015).

Cylinder repair may be needed when, for instance, a seal has started to leak as a result of wear. To make the repair, authorized contract workshops take the brake cylinders apart, replace the packing and reassemble the transmitter cylinder and close it. However, laymen or those without adequate training also attempt to repair a defective brake cylinder. Due to the complicated construction of these cylinders, mistakes are constantly made in assembling the individual parts, and in some cases, very sensitive parts, such as sealing lips, are improperly handled. The result is a failure of the brake system which sometimes takes place only at a later time and may lead to dangerous traffic accidents.

SUMMARY OF THE INVENTION

The object of the present invention is to develop transmitter cylinders of the aforementioned type such that improper attempts at repair by laymen and inexperienced workers are prevented or at least are made difficult.

The transmitter cylinder for the hydraulic brake system of an automotive vehicle has a first, pedal side and a piston extends into that cylinder and is connected to be driven by the brake pedal of the vehicle. The piston connected with the pedal is movable into and out of the cylinder bore.

To prevent unauthorized persons from opening the transmitter cylinder, a separate lock part is installed in the cylinder bore toward the first or pedal side. The lock part extends annularly around the piston, and there is an opening in the lock part that is shaped and sized for guiding the piston in its movement. The lock part is installed in the first side of the cylinder. The lock part includes removal prevention means for preventing removal of the lock part from the cylinder bore, once the lock part has been installed in the cylinder bore.

In one embodiment, the lock part is a hollow annulus in cross-section. In another embodiemnt, the lock part is a solid annulus.

In the axial direction of the cylinder, the lock part has a rectangular cross-section.

The lock part removal prevention means comprises lock means or a locking element that extends from the lock part, which is installed in the cylinder bore, to the inside of the cylinder bore. In a first embodiment, the lock part has a radial projection on its outer surface which is snappable into a groove defined in the interior of the cylinder bore as the lock part is installed in the cylinder. In the second embodiment, as in the first embodiment, there is a first groove in the cylinder bore. In the second embodiment, there is also a second groove in the outer surface of the lock part. The lock means comprises a spring-action retaining ring in the second groove in the lock part, which ring has a normal bias so that the ring projects out of the second groove sufficiently that upon installation of the lock part with the retaining ring therein into the cylinder bore, and upon the ring finally reaching the first groove in the cylinder bore, the ring is biased to snap into the first groove in the cylinder bore and to thereby extend into both of the grooves in the lock part and the cylinder bore for locking the two together.

The lock part must be removed to make repairs in the transmitter cylinder. For this purpose, the outwardly or pedal facing side of the lock part is provided with removal means, such as segment shaped cutouts in that side, which facilitate a tool grasping the lock part for drawing the same out of the pedal side. Alternately, the lock part is notched so that it breaks upon force being applied to it to facilitate its extraction.

The transmitter cylinder normally includes a sealing ring around the piston in the cylinder bore. The lock part is located toward the outside of the sealing ring and the lock part is abuttable with the sealing ring upon installation of the lock part in the cylinder bore, whereby the lock part may serve as a stop for the sealing ring. The after run space behind the lock part in the cylinder is limited by the lock part. The after run space is that region in the cylinder that is beyond the sealing ring and radially outside the piston. It provides a pressure relief pathway from the master cylinder which is blocked by the piston.

Due to the fastening of the lock part in the cylinder bore, the cylinder bore is no longer accessible from the outside. This prevents laymen and inexperienced workers from attempting inexpert repair on these parts which are so important from the standpoint of safety. An authorized workshop having the tool required for removing the lock part must effect the repair. In the workshop, the brake cylinder can be taken apart following destruction of the lock part, can be repaired and then can be again properly assembled. In addition to the parts of the cylinder which must be replaced for the repair, merely a new lock part is required, since the old lock part has been rendered unusable due to the shearing off of the radial projection on the lock part which had been snapped into the cylinder bore groove. In the embodiment with the inserted spring-action retaining ring, the lock part is sheared off at the place of intended breakage formed by the notches on the end faces.

The lock part can advantageously at the same time serve for centering and guiding the piston and can limit the after-run space, as it forms a stop for the sealing sleeve. The parts previously necessary, such as the stop disk and retaining ring (DIN 472), are done away with.

The invention will now be explained in further detail with reference to two illustrative embodiments.

DESCRIPTION OF THE PREFERRED EMBODIMENTS

Figure 1:
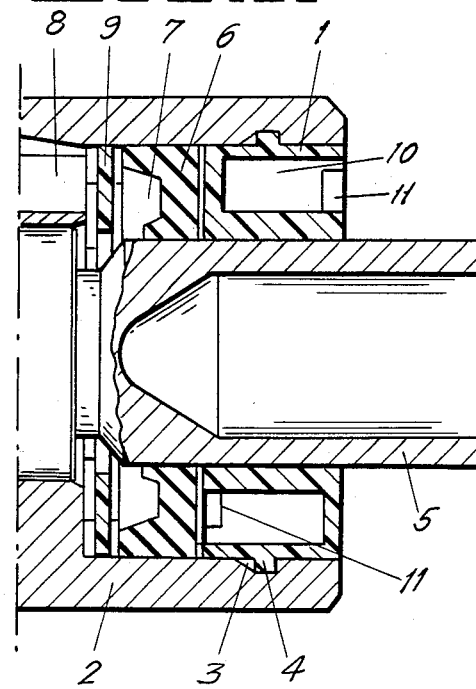
FIG. 1 is a side cross-sectional view through the development of the lock part in a cylinder according to the invention, viewed along the lines 1—1 in FIG. 2.
Figure 2:
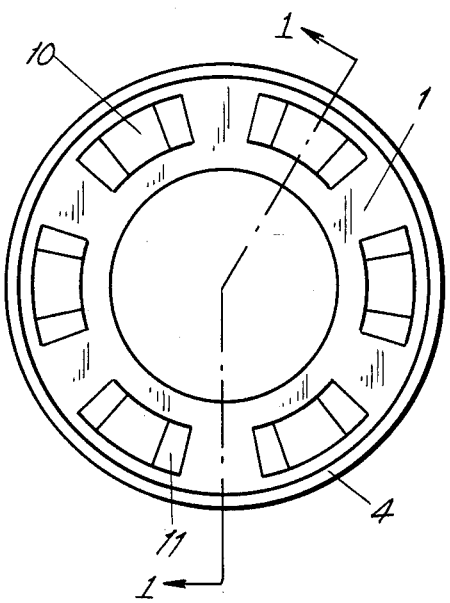
FIG. 2 is an end view of the cylinder of FIG. 1.

The lock part according to the invention is used for a transmitter cylinder, and particularly for the brake cylinder 2, which has an internal bore defined by an interior wall. The right-hand end of the cylinder 2 is the pedal side end. The internal wall of the cylinder bore is provided near the pedal side end with a circumferential groove with a flat, radially extending outward wall, which blocks the removal of the lock part 1 from the cylinder bore.

The lock part 1 comprises a hollow annulus with an exterior wall and with an interior wall spaced away from the exterior wall for defining the hollow annulus. Along the axis of the cylinder, the lock part is developed in crosssection as a rectangular hollow profile. The profile includes segment shaped cutouts 10 and segment shaped webs 11 at both of its opposite axial ends. The webs 11 are graspable by a clamping tool because of the clearances provided by the cutouts 10 next to each web. These are provided so that lock part withdrawal tools may be secured to them in the workshop to enable extraction of the lock part from the cylinder bore. The lock part is symmetric between its axial sides, and the below-described locking element is axially centrally located along the locked part.

The outer surface of the lock part is provided with an annular, radially projecting projection 4 which is shaped to snap into an annular groove 3 defined into the cylinder bore when the lock part is pushed into and installed in the cylinder bore from the pedal side. The lock part should be stiff enough to be readily deflectable. Yet, its interior and exterior sides should be yieldable enough that the lock part and/or the radial projection thereon will deflect inwardly sufficiently to permit the lock part to be installed in the cylinder bore until the projection slides and snaps into the groove 3. Once the snap connection between the lock part and the cylinder has occurred, extraction of the lock part from the cylinder is quite difficult, without use of the appropriate tools applied to the removal means 10, 11 on the lock part.

The bore through the lock part is shaped and sized for receiving, centering and guiding the piston. The piston 5 is connected with a pedal (not shown) and extends into the cylinder through the central bore of the lock part 1. The piston 5 is centered and guided in the bore of the lock part, so that tilting forces produced by the pedal rod or connection to the piston 5 will not cause improper action of the piston and will not harm the sealing sleeve 6 which is beyond the lock part inside the cylinder.

There is an after-run space 7 behind the lock part and this communicates past a filling disk 9 in the interior of the cylinder with an after-run bore 8 in the cylinder. The space 7 radially outside the piston 5 relieves the cylinder behind the piston 5 through the bore 8 when the piston 5 is withdrawn sufficiently to unblock access to the space 7.

A sealing sleeve 6 is disposed in the cylinder bore around the piston and inward of the lock part 1. The lock part is so sized and placed and the sealing sleeve is so placed that the lock part serves as a stop for the sealing sleeve, and the sealing sleeve permits communication between the after-run space 7 and the after-run bore 8.

Figure 3:
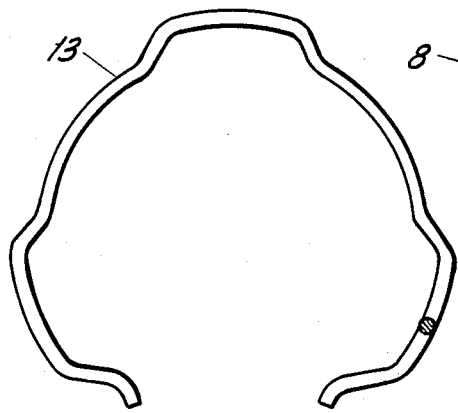
FIG. 3 is an end view of a retaining ring for a second embodiment of a lock part of the invention.
Figure 4:
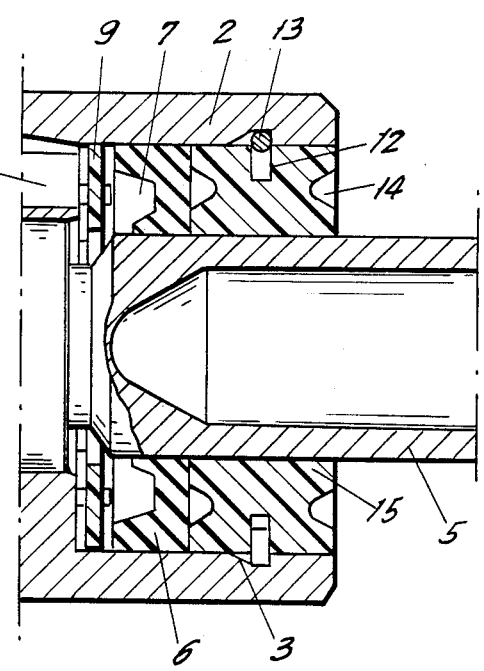
FIG. 4 shows the second embodiment of a cylinder with a lock part with an inserted retaining ring of FIG. 3.

In the second embodiment of FIGS. 3 and 4, the transmitter cylinder 2, piston 5 and sealing sleeve 6, disk 9 and spaces 7 and 8 are substantially the same as in the first embodiment, and are not further described. The primary difference between the first and second embodiments is in the lock part 15 of the second embodiment. It comprises a solid profile ring, rather than a hollow profile, deflectable ring. At the radially outer surface of the lock part 15, there is an annular, axially narrow groove 12 into which an undulating shape or slit spring-action retaining ring 13 is installed. The ring is so shaped that it projects into the groove 12 and is also so shaped as to project out of that groove, and to be biased to project out of that groove when it is forced back into that groove upon installation of the lock part 15 in the cylinder 2. As previously, there is the annular groove 3 inside the cylinder bore. Upon insertion of the lock part 15 into the cylinder 2, the retaining ring 13 is first moved inwardly and against its normal spring force into the groove 12 so that the lock part and the spring will fit into the cylinder bore. When the groove 12 in the lock part has finally moved opposite the groove 3 in the cylinder bore, the retaining ring moves apart under its normal spring bias and snaps into the groove 3 in the cylinder. so that the retaining ring is now in both the lock part groove 12 and the cylinder groove 3. This axially fixes the lock part in the cylinder.

The lock part 15 is provided at its opposite end faces with notches 14 which define points of intended breakage and permit breaking off and thus release of the lock part by an appropriate tool, which then facilitates removal of the lock part from the cylinder.

As a matter of choice, the retaining ring arrangement of FIG. 4 might be used in the embodiment of FIG. 1, through providing an appropriate groove in the lock part 1 of FIG. 1. Other features of the lock part of FIGS. 1 and 4 may be used interchangeably with minimal adaptation of the respective lock parts.

Although the present invention has been described in connection with a number of preferred embodiments thereof, many variations and modifications will now become apparent to those skilled in the art. It is preferred, therefore, that the present invention be limited not by te specific disclosure herein, but only by the appended claims.

What is claimed is:

1. A transmitter cylinder for the hydraulic brake system of a vehicle, or the like, the transmitter cylinder comprising a cylinder with a bore in it; the cylinder having a first axial side; a piston movable into and out of the cylinder bore from the first side;

a separate lock part installed in the cylinder bore toward the first side of the bore, the lock part having a peripheral wall which contacts the surrounding cylinder bore;

and removal prevention means at the lock part for preventing removal of the lock part from the cylinder bore once the lock part is installed in the cylinder bore; the removal prevention means comprises lock means extending from the peripheral wall of the lock part on the cylinder bore to the inside of the cylinder bore; the lock means being connectable to the cylinder bore by a snap connection; the lock means being breakable for releasing the lock part to be removed from the cylinder bore;

a sealing sleeve around the piston in the cylinder bore; the sealing sleeve being disposed inside the cylinder bore beyond the installed lock part; the sealing sleeve being shaped to be shiftable along the cylinder bore; the lock part being abuttable with the sealing sleeve upon installation of the lock part in the cylinder bore, and the lock part serving as a stop for the sealing sleeve for preventing movement of the sealing sleeve out of the bore; and the cylinder bore being shaped to define an afterrun space therein around the piston, and that after-run space being further in the cylinder than the sealing sleeve; the lock part and the sealing sleeve serve as a limit for the after-run space.

2. The transmitter cylinder of claim 1, wherein the removal prevention means comprises a groove formed inside the cylinder in the bore toward the one axial side of the cylinder; the lock part including an outer surface in the bore, and the lock means comprising a radial projection from the lock part outer surface, the projection being snappable into the groove in the cylinder bore upon installation of the lock part in the cylinder; the projection being breakable for enabling removal of the lock part.

3. The transmitter cylinder of claim 2, wherein the lock part has an outward facing side toward the one side of the cylinder, and the outward facing side of the lock part has removal means thereon for being engaged to effect removal of the lock part against the locking thereof by the lock means; the removal means comprises segment-shaped cutouts defined on the outward facing side of the lock part.

4. The transmitter cylinder of claim 1, wherein the lock part is an annulus and the annulus is hollow with an annular outer part and a radially spaced away annular inner part inside the outer part; the inner part defining a bore, and the piston extending through the bore of the inner part of the lock part and into the cylinder bore.

5. The transmitter cylinder of claim 4, wherein in the direction along the axis of the cylinder, the lock part has a rectangular cross-section.

6. The transmitter cylinder of claim 5, wherein the lock part has an outward facing side toward the one side of the cylinder, and the outward facing side of the lock part has removal means thereon for being engaged to effect removal of the lock part from the cylinder against the locking of the lock part to the cylinder by the lock means.

7. The transmitter cylinder of claim 5, wherein the lock part inner part bore is shaped for centering and guiding the piston, and the piston extending through the lock part central bore to be guided thereby.

8. The transmitter cylinder of claim 1, wherein the lock part has an outward facing side toward the one side of the cylinder, and the outward facing side of the lock part has removal means thereon for being engaged to effect removal of the lock part from the cylinder against the locking of the lock part to the cylinder by the lock means.

9. The transmitter cylinder of claim 8, wherein the removal means comprises segment-shaped cutouts defined on the outward facing sides of the lock part.

10. The transmitter cylinder of claim 1, wherein the lock part has a central bore defined in it which is shaped for centering and guiding the piston, and the piston extends through the lock part central bore to be guided thereby.

* * * * *